C. BEIDLER.
Plow.
No. 56,350.
Patented July 17, 1866.
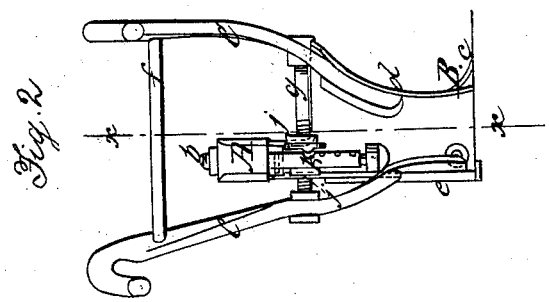
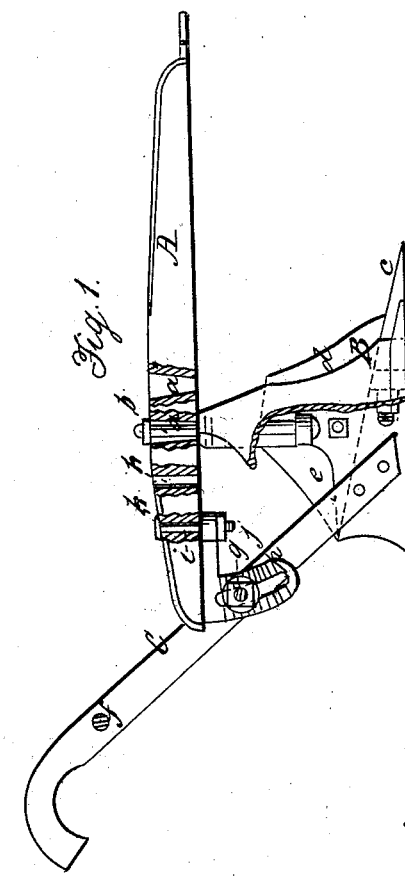
Witnesses:
Wm. F. McNamara
J. P. Hall
Inventor:
Charles Beidler
per Munn & Co.
Attorneys ly the upper ends by a cross-bar, $f$, and about the middle of their
UNITED STATES PATENT OFFICE.

CHARLES BEIDLER, OF ALLENTOWN P. O., PENNSYLVANIA.

IMPROVEMENT IN PLOWS.

Specification forming part of Letters Patent No. 56,350, dated July 17, 1866.

*To all whom it may concern:*

Be it known that I, CHARLES BEIDLER, of Allentown P. O., in the county of Lehigh and State of Pennsylvania, have invented a new and Improved Plow; and I do hereby declare that the following is a full, clear, and exact description thereof, which will enable others skilled in the art to make and use the same, reference being had to the accompanying drawings, forming part of this specification, in which—

Figure 1 represents a sectional side elevation of my invention, the plane of section being indicated by the line $x$ $x$, Fig. 2. Fig. 2 is an end elevation of the same.

Similar letters of reference indicate like parts.

This invention consists in the application to a plow-beam of a serrated segmental guide-strip, in combination with suitable set-nuts, and with a transverse screw-rod connecting the two handles of the plow in such a manner that the rear end of the plow-beam can be set higher or lower to adjust the depth of the cut, and also moved laterally in either direction to give to the plow more or less land, as may be desirable.

A represents the beam of my plow, which is constructed of wood or any other suitable material, in the ordinary form or shape. This beam is provided with two or more holes, $a$, to receive the screw-bolt $b$, by means of which the plowshare B is secured to the beam. This share may be made in any desirable shape or form, and I do not wish to confine myself to the precise form shown in the drawings. The share which I have shown is composed of the metallic tooth $c$, mold-board $d$, and land-side $e$, all of metal, and fastened together by suitable screws.

C C are the handles, which are secured by means of screws or rivets, one to the mold-board and the other to the land-side, as clearly shown in Fig. 2 of the drawings. These handles are connected near their upper ends by a cross-bar, $f$, and about the middle of their length, a little below the rear end of the beam, by a screw-rod, $g$. This screw-rod passes through a slot in a segmental bracket, $h$, which is secured to the under surface of the beam by means of a screw-bolt, $i$. The slot in the bracket forms a portion of a circle described from the top end of the plowshare or standard connecting said share to the beam, and said top end forms the fulcrum on which the beam turns as the rear end of the same is adjusted higher or lower.

The bracket $h$ is adjusted on the screw-rod $g$ by set-nuts $j$, and one or both of its sides may be serrated to give a firm hold to a tooth projecting from a washer under one or both set-nuts.

By means of this guide-bracket and screw-rod the rear end of the beam can be moved up and down, and also laterally, and by adjusting it up and down the depth to which the plow cuts is regulated, whereas by the lateral motion of the rear end of the beam more or less land is given to the plow.

The bolt $i$, which secures the bracket $h$ to the beam, passes through a hole, $k$, in the beam, and said beam is furnished with two or more such holes, corresponding to the holes $a$, which receive the bolt $b$, that secures the plowshare to the beam.

By releasing the two bolts $i$ and $b$ the beam can be adjusted backward and forward, if desired.

I claim as new and desire to secure by Letters Patent—

The segmental guide-bracket $h$, in combination with the screw-rod $g$, set-nuts $j$, handles C C, and beam A, and operating in the manner and for the purpose substantially as herein shown and described.

CHARLES BEIDLER.

Witnesses:
FERDINAND BUCHMAN,
H. K. WITTMAN.